(12) United States Patent
Ruggeri et al.

(10) Patent No.: US 11,398,847 B2
(45) Date of Patent: Jul. 26, 2022

(54) RADIO HAVING HYBRID STARING AND NON-STARING ARCHITECTURE

(71) Applicant: Rockwell Collins, Inc., Cedar Rapids, IA (US)

(72) Inventors: Angelo Ruggeri, Cedar Rapids, IA (US); David A. Gribble, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/196,556

(22) Filed: Mar. 9, 2021

(65) Prior Publication Data

US 2021/0306026 A1 Sep. 30, 2021

Related U.S. Application Data

(60) Provisional application No. 63/002,795, filed on Mar. 31, 2020.

(51) Int. Cl.
| | |
|---|---|
| *H04B 1/713* | (2011.01) |
| *H04B 1/7143* | (2011.01) |
| *H04L 9/06* | (2006.01) |
| *H04B 1/7136* | (2011.01) |

(52) U.S. Cl.
CPC ......... *H04B 1/7143* (2013.01); *H04B 1/7136* (2013.01); *H04L 9/06* (2013.01)

(58) Field of Classification Search
CPC .... H04B 1/7143; H04B 1/7136; H04B 1/707; H04B 1/692; H04B 1/713; H04L 9/06; H04L 9/065; H04K 2203/22; H04K 1/003; H04K 1/10; H04K 3/827

USPC .................................................. 375/132–138
See application file for complete search history.

(56) References Cited

U.S. PATENT DOCUMENTS

| | | | | |
|---|---|---|---|---|
| 6,052,406 | A * | 4/2000 | Epstein | .................. H04J 13/00 375/130 |
| 7,457,299 | B2 | 11/2008 | Fette et al. | |
| 7,680,077 | B1 | 3/2010 | Clark et al. | |
| 8,149,936 | B2 | 4/2012 | Koslov et al. | |
| 8,270,454 | B2 * | 9/2012 | Sugaya | ................... H04L 5/003 375/267 |

(Continued)

FOREIGN PATENT DOCUMENTS

IN  5699CHENP2010 A  10/2009

*Primary Examiner* — Don N Vo
(74) *Attorney, Agent, or Firm* — Suiter Swantz pc llo

(57) ABSTRACT

A system may include a first radio comprising a first radio processor, a first radio modem, and a first radio transmitter configured to transmit non-hopping transmissions and hopping transmissions. The system may further include a second radio comprising a second radio processor, a second radio modem, and a second radio hopping receiver, wherein the second radio hopping receiver is a non-staring second radio receiver. The first radio may be configured to: receive a message and a destination for the message, the destination being the second radio; upon a determination that the destination has a non-staring receiver, store the message; determine a time interval start time for a cyclical hop pattern associated with the second radio; output the message from the memory to the first radio modem; output the message from the first radio modem to the first radio transmitter; and/or transmit the message to the second radio.

15 Claims, 3 Drawing Sheets

(56) References Cited

U.S. PATENT DOCUMENTS

| | | | |
|---|---|---|---|
| 8,711,774 B2 | 4/2014 | Tamaki | |
| 8,798,221 B1 * | 8/2014 | Marsh | H04L 27/2692 |
| | | | 375/365 |
| 2007/0249341 A1 * | 10/2007 | Chu | H04W 16/02 |
| | | | 455/434 |
| 2009/0135887 A1 * | 5/2009 | Andersson | H04B 1/7156 |
| | | | 375/E1.034 |
| 2019/0149189 A1 * | 5/2019 | Schwoerer | H04L 5/0012 |
| | | | 375/132 |

* cited by examiner

US 11,398,847 B2

RADIO HAVING HYBRID STARING AND NON-STARING ARCHITECTURE

CROSS-REFERENCE TO RELATED APPLICATIONS

The present application is related to and claims priority from: U.S. Application Ser. No. 63/002,795, titled RADIO HAVING HYBRID STARING AND NON-STARING ARCHITECTURE, filed Mar. 31, 2020. U.S. Application Ser. No. 63/002,795 is herein incorporated by reference in its entirety.

BACKGROUND

In a digital communications system, the need for additional throughput often leads to the use of a staring receiver architecture. A disadvantage of staring receivers is higher size and power compared to traditional radio equipment such as hopping receivers. Another limitation of staring architectures, besides size, weight, and power (SWaP), is that both ends of a data link are typically required to be homogeneous (e.g., both staring). This can create interoperability issues when physically small radio installations lack enough volume for a complex staring receiver.

SUMMARY

In one aspect, embodiments of the inventive concepts disclosed herein are directed to a system. The system may include a first radio comprising at least one first radio processor, a first radio modem, and a first radio transmitter configured to transmit non-hopping transmissions and hopping transmissions. The system may further include a second radio comprising at least one second radio processor, a second radio modem, and a second radio hopping receiver, wherein the second radio hopping receiver is a non-staring second radio receiver. The first radio may be configured to: receive a message and a destination for the message, the destination being the second radio; determine whether the destination has a staring receiver or a non-staring receiver; upon a determination that the destination has the non-staring receiver, store the message in memory; determine a time interval start time for a cyclical hop pattern associated with the second radio based on a pseudo-random code by using encryption keys; once the time interval start time has been reached, output the message from the memory to the first radio modem for processing; output the message from the first radio modem to the first radio transmitter; and/or transmit the message to the second radio.

In a further aspect, embodiments of the inventive concepts disclosed herein are directed to a method. The method may include: receiving, by a first radio, a message and a destination for the message, the destination being the second radio, the first radio comprising at least one first radio processor, a first radio modem, and a first radio transmitter configured to transmit non-hopping transmissions and hopping transmissions, the second radio comprising at least one second radio processor, a second radio modem, and a second radio hopping receiver, wherein the second radio hopping receiver is a non-staring second radio receiver; determining, by the first radio, whether the destination has a staring receiver or a non-staring receiver; upon a determination that the destination has the non-staring receiver, storing, by the first radio, the message in memory; determining, by the first radio, a time interval start time for a cyclical hop pattern associated with the second radio based on a pseudo-random code by using encryption keys; once the time interval start time has been reached, outputting, by the first radio, the message from the memory to the first radio modem for processing; outputting, by the first radio, the message from the first radio modem to the first radio transmitter; and/or transmitting, by the first radio, the message to the second radio.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
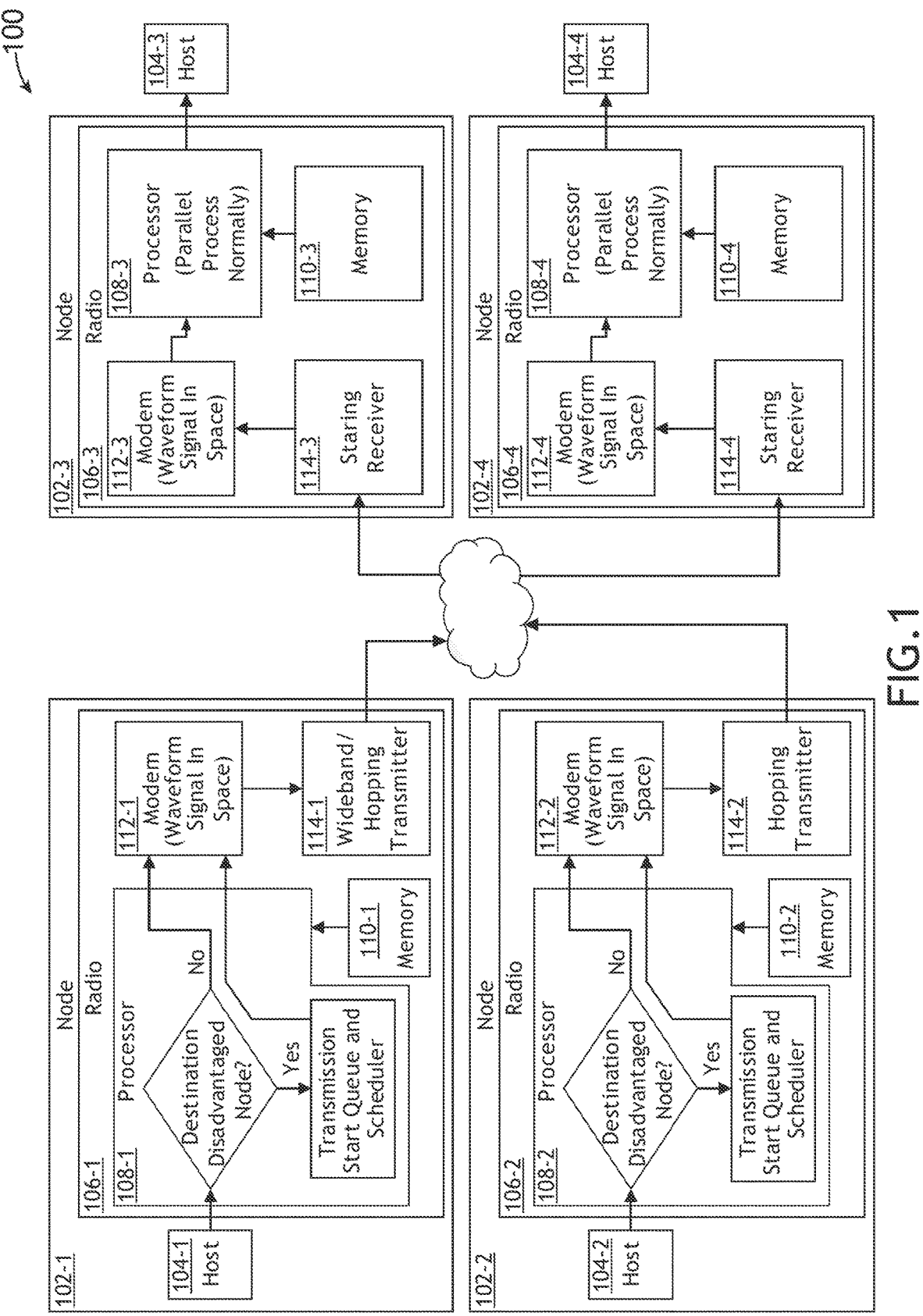
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system configured to transmit messages from a radio having a hybrid staring and non-staring architecture to another radio having a non-staring architecture.

A staring receiver can process more than one frequency at a time. Staring receivers are typically implemented when needed to process wideband, time-indeterminate signals. Older, more traditional radios do not use staring receivers due to the increased hardware and processing resource requirements. Some embodiments may allow a legacy radio with less analog and digital resources to interoperate with a radio that implements a staring receiver. While a legacy hopping receiver can only process a single frequency at a time, some embodiments may include a means for coordinating a transmission to a hopping receiver in situations when a predetermined or predictable hopping pattern may not be available or desirable, such as for military communications. Some embodiments may provide cost savings by allowing the use of hopping receivers that are typically less expensive than staring receivers.

Some embodiments may include a system and a method for digital communications that may allow both wideband/staring receivers and narrowband/hopping receivers to interoperate for secure communications applications utilizing a hybrid approach. The hybrid approach may enable disadvantaged (e.g., physically small and/or power limited, preventing the use of a staring receiver) nodes to interoperate with advantaged nodes (e.g., those that contain wideband or staring receivers). Some embodiments may utilize a predefined cryptographically protected timing sequence to enable hybrid operation of wideband and narrowband transmission to various nodes in a communications network.

Some embodiments include a hybrid receiver architecture that combines a use of analog hopping and staring architectures. Some embodiments may identify a time interval that promotes coordination with a disadvantaged install (e.g., having a non-staring radio frequency equipment). When that time interval is determined, a transmitter may hold in queue the transmission until the time interval in which the disadvantaged receiving installation can properly process the signal. Some embodiments may include a hopping transmitter, execution of a decision function to ensure that data is processed in a way to be interoperable with a desired node, execution of a transmission start queue scheduler application, and/or use of cyclic hop pattern.

Figure 2:
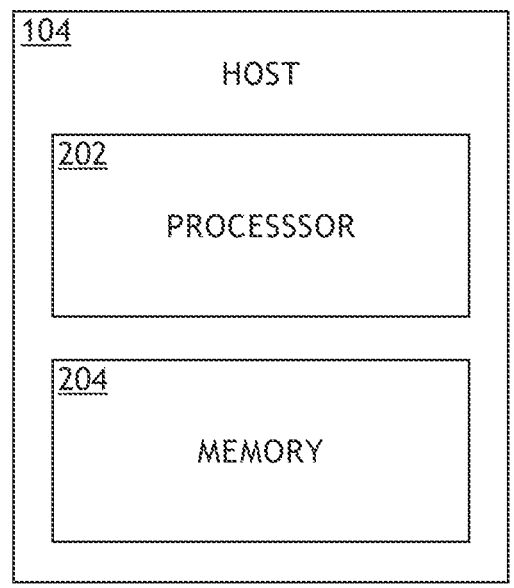
FIG. 2 is a view of an exemplary host of the system of FIG. 1 of an exemplary embodiment according to the inventive concepts disclosed herein.

Referring now to FIGS. 1-2, an exemplary embodiment of a system (e.g., a network 100) according to the inventive concepts disclosed herein is depicted. The network 100 may be implemented as any suitable network, such as a communications network, a wireless network, an optical communications network, and/or a mobile ad-hoc network (MANET). The network 100 is shown in the FIG. 1 with four nodes (102-1, 102-2, 102-3, 102-4), but any number of nodes may be present in the network.

For example, as shown in FIG. 1, the network 100 may include a plurality of nodes 102 (e.g., 102-1, 102-1, 102-3, 102-4), some or all of which may be communicatively coupled (e.g., wirelessly communicatively coupled) at any given time. Each of the nodes 102 may be mobile or stationary. In some embodiments, some or all of the nodes 102 may be vehicles (e.g., aircraft, watercraft, or automobiles). In some embodiments, some or all of the nodes 102 may be ground stations. In some embodiments, some or all of the nodes 102 may be carried by a user.

Each of the nodes 102 may include a host 104 (e.g., 104-1, 104-1, 104-3, 104-4) and a radio 106 (e.g., 106-1, 106-1, 106-3, 106-4), which may be communicatively coupled at any given time. Each host 104 may be any suitable computing device including at least one processor 202 and at least one memory 204, which may be communicatively coupled. Each host 104 may be configured to output at least one message (e.g., at least one digital message) and at least one intended destination (e.g., a destination node 102) for each message to a corresponding radio 106 for transmission to the destination(s), and/or each host 104 may be configured to receive at least one message (e.g., at least one digital message) from a corresponding radio 106, which received the at least one message from at least one source node 102. For example, the at least one processor 202 may include at least one general purpose processor (e.g., at least one central processing unit (CPU)), at least one digital signal processor (DSP), at least one application specific integrated circuit (ASIC), and/or at least one field-programmable gate array (FPGA). The at least one processor 202 may be configured to perform (e.g., collectively perform if more than one processor) any or all of the operations disclosed throughout. The processor 202 may be configured to run various software applications or computer code stored (e.g., maintained) in a non-transitory computer-readable medium (e.g., memory 204) and configured to execute various instructions or operations.

Each radio 106-1 may include at least one processor 108 (e.g., 108-1, 108-1, 108-3, 108-4), at least one memory 110 (e.g., 110-1, 110-1, 110-3, 110-4), at least one modem 112 (e.g., 112-1, 112-1, 112-3, 112-4), and/or at least one radio frequency equipment 114 (e.g., at least one non-hopping (e.g., wideband) and hopping transmitter 114-1, at least one at least one hopping transmitter 114-2, at least one staring receiver 114-3, at least one non-staring receiver (e.g., at least one hopping receiver 114-4), and/or at least one transceiver (which may be considered as including a receiver and a transmitter)), some or all of which may be communicatively coupled at any given time. U.S. Pat. No. 7,680,077 discusses a staring architecture for a statistical priority-based multiple access (SPMA) and is incorporated by reference herein in its entirety. A staring receiver may use an architecture that utilizes receiver(s) to simultaneously receive all possible frequencies of a particular communication system; this can be accomplished through implementing receivers at every possible frequency, a receiver(s) dedicated to a contiguous group of frequencies, and/or a single receiver processing every possible frequency. For example, each modem 112 may process a signal required prior to being output to or after being output from the radio frequency equipment, and the modem 112 may be configured for conditioning, frequency converting, modulating and/or encoding information. For example, each of the radio frequency equipment may be configured for filtering, converting to radio frequency and final amplification, and/or transmission through an antenna, or similarly in reverse for receiving. For example, each radio 106 may be a software defined radio (SDR).

The at least one processor 108 may include at least one general purpose processor (e.g., at least one central processing unit (CPU)), at least one digital signal processor (DSP), at least one application specific integrated circuit (ASIC), and/or at least one field-programmable gate array (FPGA). The at least one processor 108 may be configured to perform (e.g., collectively perform if more than one processor) any or all of the operations disclosed throughout. The processor 108 may be configured to run various software applications or computer code stored (e.g., maintained) in a non-transitory computer-readable medium (e.g., memory 110) and configured to execute various instructions or operations.

For example, as shown in FIG. 1, the radios 106-1, 106-3 of nodes 102-1, 102-3 may be considered to be full performance radios, meaning the radios 106-1, 106-3 may be configured to transmit and receive non-hopping (e.g., wideband) transmissions and hopping transmissions. As such, the radios 106-1, 106-3 may include staring receivers (e.g., 114-3) and non-hopping (e.g., wideband) transmitters (e.g., 114-1). For example, as shown in FIG. 1, the radios 106-2, 106-4 of nodes 102-2, 102-4 may be considered to be disadvantaged radios, meaning the radios 106-2, 106-4 may be configured to transmit and receive hopping transmissions but not non-hopping (e.g., wideband) transmissions. As such, the radios 106-2, 106-4 may include non-staring receivers (e.g., 114-4) and non-staring transmitters (e.g., 114-2). In some embodiments, use of a disadvantaged radio may have the benefit of allowing the disadvantaged radio to be installed in a tightly constrained physical location that may require small hardware, or in a location which cannot have active cooling for electronics which can drive the hardware to have lower power capability of digital and analog processing.

In an exemplary embodiment, a system (e.g., the network 100) may include a first radio (e.g., 106-1) comprising at least one first radio processor (e.g., 108-1), a first radio modem (e.g., 112-1), and a first radio transmitter (e.g., 114-1) configured to transmit non-hopping (e.g., wideband) transmissions and hopping transmissions. The system may further include a second radio (e.g., 106-4) comprising at least one second radio processor (108-4), a second radio modem (e.g., 112-4), and a second radio hopping receiver (e.g., 114-4), wherein the second radio hopping receiver (e.g., 114-4) is a non-staring second radio receiver. The first radio (e.g., 106-1) may be configured to: receive a message and a destination for the message, the destination being the second radio (e.g., 106-4); determine whether the destination has a staring receiver or a non-staring receiver; upon a determination that the destination has the non-staring receiver, execute transmission start queue and scheduler and/or store the message in memory (e.g., 110-1); determine a time interval start time for a cyclical hop pattern associated with the second radio (e.g., 106-4) based on a pseudo-random code by using encryption keys; once the time interval start time has been reached, output the message from the memory (e.g., 110-1) to the first radio modem (e.g., 112-1) for processing; and output the message from the first radio modem (e.g., 112-1) to the first radio transmitter (e.g., 114-1); and transmit the message to the second radio (e.g., 106-4). In some embodiments, the second radio (e.g., 106-4) may be configured to process one frequency channel at a time according to the cyclical hop pattern. In some embodiments, the second radio hopping receiver (e.g., 114-4) may be configured to receive one frequency channel at the time according to the cyclical hop pattern. As used throughout, the time interval may be a predetermined start time of a transmission with an allocated margin of error to accommodate differences in clocks between a transmitting radio and receiving radio.

In some embodiments, the system may further include a third radio (e.g., 106-3), the third radio (e.g., 106-3) comprising at least one third radio processor (108-3), a third radio modem (e.g., 112-3), and a third radio staring receiver (e.g., 114-3). The first radio (e.g., 106-1) may be further configured to: receive a second message and a second destination for the second message, the second destination being the third radio (e.g., 106-3); determine that the second destination has a staring receiver (e.g., 114-3); upon the determination that the second destination has the staring receiver (e.g., 114-3), output the second message to the first radio modem (e.g., 112-1) for processing; output the second message from the first radio modem (e.g., 112-1) to the first radio transmitter (e.g., 112-1); and transmit the second message to the third radio (e.g., 106-3).

In some embodiments, the first radio may further include a first radio hopping receiver, wherein the first radio hopping receiver is a non-staring first radio receiver. In some embodiments, the first radio may further include a first radio staring receiver.

In some embodiments, the system (e.g., the network 100) may further include a first host (e.g., 104-1) communicatively coupled to the first radio (e.g., 106-1), the first host (e.g., 104-1) comprising a first host processor (e.g., 202), the first host (e.g., 104-1) configured to output the message to the first radio (e.g., 106-1). In some embodiments, the first host (e.g., 104-1) may be a vetronics computing device (e.g., an avionics computing device, such as a flight or mission computer) and/or may be installed in a vehicle (e.g., an aircraft). In some embodiments, the first host (e.g., 104-1) may be stationary (e.g., installed in a ground station). In some embodiments, the system (e.g., the network 100) may further include a second host (e.g., 104-4) communicatively coupled to the second radio (e.g., 106-4), the second host (e.g., 104-4) comprising a second host processor (e.g., 202), the second host (e.g., 104-4) configured to receive the message from the second radio (e.g., 106-4). In some embodiments, the second host (e.g., 104-4) may be a vetronics computing device (e.g., an avionics computing device, such as a flight or mission computer) and/or may be installed in a vehicle (e.g., an aircraft). In some embodiments, the second host (e.g., 104-4) may be stationary (e.g., installed in a ground station).

Figure 3:
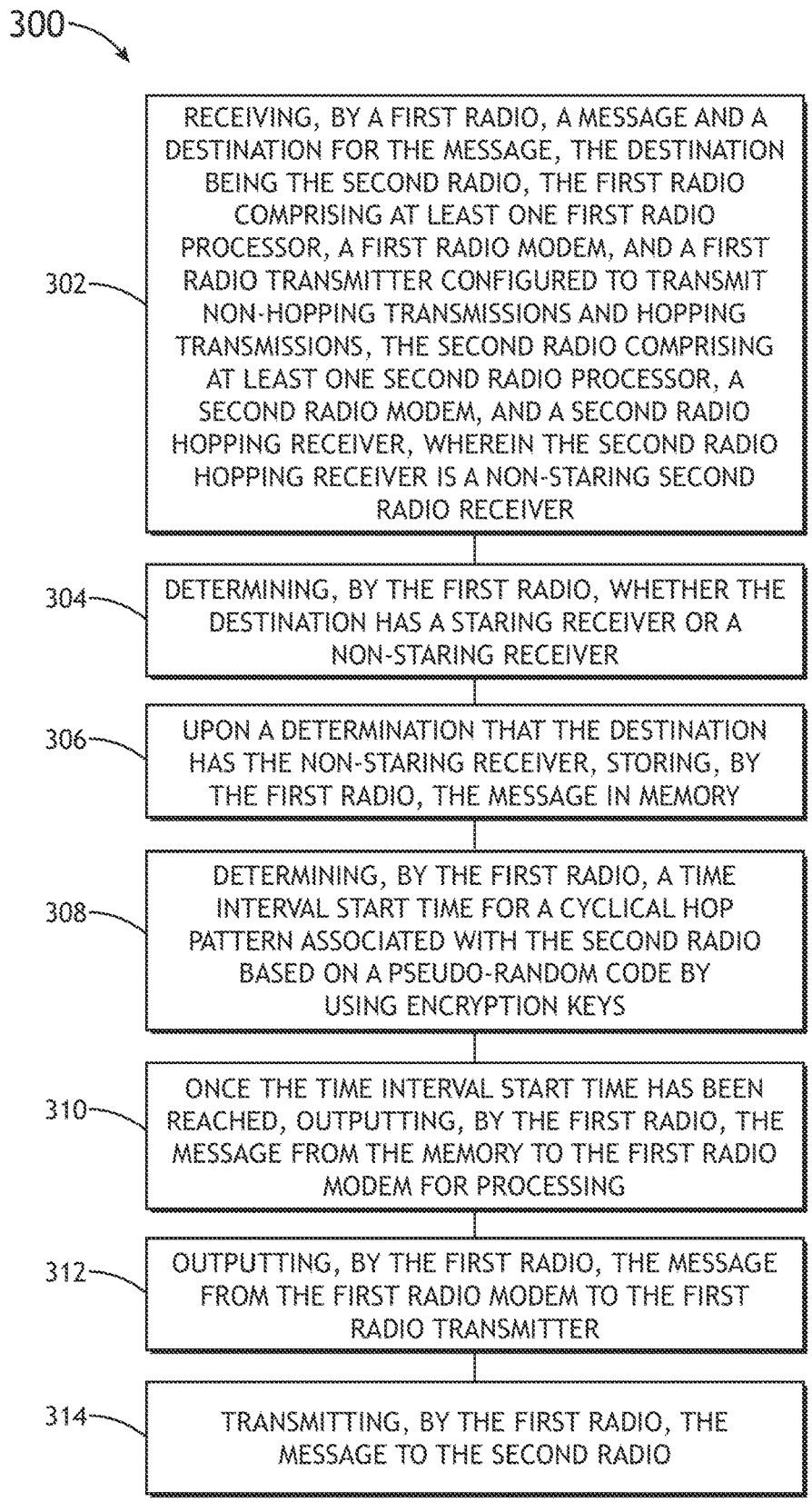
FIG. 3 is a diagram of an exemplary embodiment of a method according to the inventive concepts disclosed herein.

Referring now to FIG. 3, an exemplary embodiment of a method 300 according to the inventive concepts disclosed herein may include one or more of the following steps. Additionally, for example, some embodiments may include performing one more instances of the method 300 iteratively, concurrently, and/or sequentially. Additionally, for example, at least some of the steps of the method 300 may be performed in parallel and/or concurrently. Additionally, in some embodiments, at least some of the steps of the method 300 may be performed non-sequentially.

A step 302 may include receiving, by a first radio, a message and a destination for the message, the destination being the second radio, the first radio comprising at least one first radio processor, a first radio modem, and a first radio transmitter configured to transmit staring transmissions and hopping transmissions, the second radio comprising at least one second radio processor, a second radio modem, and a second radio hopping receiver, wherein the second radio hopping receiver is a non-staring second radio receiver.

A step 304 may include determining, by the first radio, whether the destination has a staring receiver or a non-staring receiver.

A step 306 may include upon a determination that the destination has the non-staring receiver, storing, by the first radio, the message in memory.

A step 308 may include determining, by the first radio, a time interval start time for a cyclical hop pattern associated with the second radio based on a pseudo-random code by using encryption keys.

A step 310 may include once the time interval start time has been reached, outputting, by the first radio, the message from the memory to the first radio modem for processing.

A step 312 may include outputting, by the first radio, the message from the first radio modem to the first radio transmitter.

A step 314 may include transmitting, by the first radio, the message to the second radio.

Further, the method 300 may include any of the operations disclosed throughout.

As will be appreciated from the above, embodiments of the inventive concepts disclosed herein may be directed to a method and a system configured to transmit messages from a radio having a hybrid staring and non-staring architecture to another radio having a non-staring architecture.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a first radio comprising at least one first radio processor, a first radio modem, and a first radio transmitter configured to transmit non-hopping transmissions and hopping transmissions; and
a second radio comprising at least one second radio processor, a second radio modem, and a second radio hopping receiver, wherein the second radio hopping receiver is a non-staring second radio receiver;
wherein the first radio is configured to:
receive a message and a destination for the message, the destination being the second radio;
determine whether the destination has a staring receiver or a non-staring receiver;
upon a determination that the destination has the non-staring receiver, store the message in memory;
determine a time interval start time for a cyclical hop pattern associated with the second radio based on a pseudo-random code by using encryption keys;
once the time interval start time has been reached, output the message from the memory to the first radio modem for processing;
output the message from the first radio modem to the first radio transmitter; and
transmit the message to the second radio.

2. The system of claim 1, further comprising a third radio, the third radio comprising at least one third radio processor, a third radio modem, and a third radio staring receiver,
wherein the first radio is further configured to:
receive a second message and a second destination for the second message, the second destination being the third radio;
determine that the second destination has a staring receiver;
upon the determination that the second destination has the staring receiver, output the second message to the first radio modem for processing;

output the second message from the first radio modem to the first radio transmitter; and transmit the second message to the third radio.

3. The system of claim 1, wherein the first radio further comprises a first radio hopping receiver, wherein the first radio hopping receiver is a non-staring first radio receiver.

4. The system of claim 1, wherein the first radio further comprises a first radio staring receiver.

5. The system of claim 1, further comprising a first host communicatively coupled to the first radio, the first host comprising a first host processor, the first host configured to output the message to the first radio.

6. The system of claim 5, wherein the first host is installed in a vehicle.

7. The system of claim 6, wherein the vehicle is an aircraft, wherein the first host is an avionics computing device.

8. The system of claim 5, wherein the first host is stationary.

9. The system of claim 5, further comprising a second host communicatively coupled to the second radio, the second host comprising a second host processor, the second host configured to receive the message from the second radio.

10. The system of claim 9, wherein the second host is installed in a vehicle.

11. The system of claim 10, wherein the vehicle is an aircraft, wherein the second host is an avionics computing device.

12. The system of claim 9, wherein the second host is stationary.

13. The system of claim 1, wherein the second radio is configured to process one frequency channel at a time according to the cyclical hop pattern.

14. The system of claim 13, wherein the second radio hopping receiver is configured to receive one frequency channel at the time according to the cyclical hop pattern.

15. A method, comprising:

receiving, by a first radio, a message and a destination for the message, the destination being the second radio, the first radio comprising at least one first radio processor, a first radio modem, and a first radio transmitter configured to transmit non-hopping transmissions and hopping transmissions, the second radio comprising at least one second radio processor, a second radio modem, and a second radio hopping receiver, wherein the second radio hopping receiver is a non-staring second radio receiver;

determining, by the first radio, whether the destination has a staring receiver or a non-staring receiver;

upon a determination that the destination has the non-staring receiver, storing, by the first radio, the message in memory;

determining, by the first radio, a time interval start time for a cyclical hop pattern associated with the second radio based on a pseudo-random code by using encryption keys;

once the time interval start time has been reached, outputting, by the first radio, the message from the memory to the first radio modem for processing;

outputting, by the first radio, the message from the first radio modem to the first radio transmitter; and transmitting, by the first radio, the message to the second radio.

* * * * *